Jan. 1, 1929.
A. B. SHULTZ
1,697,577
SHOCK ABSORBER
Original Filed Feb. 3, 1926
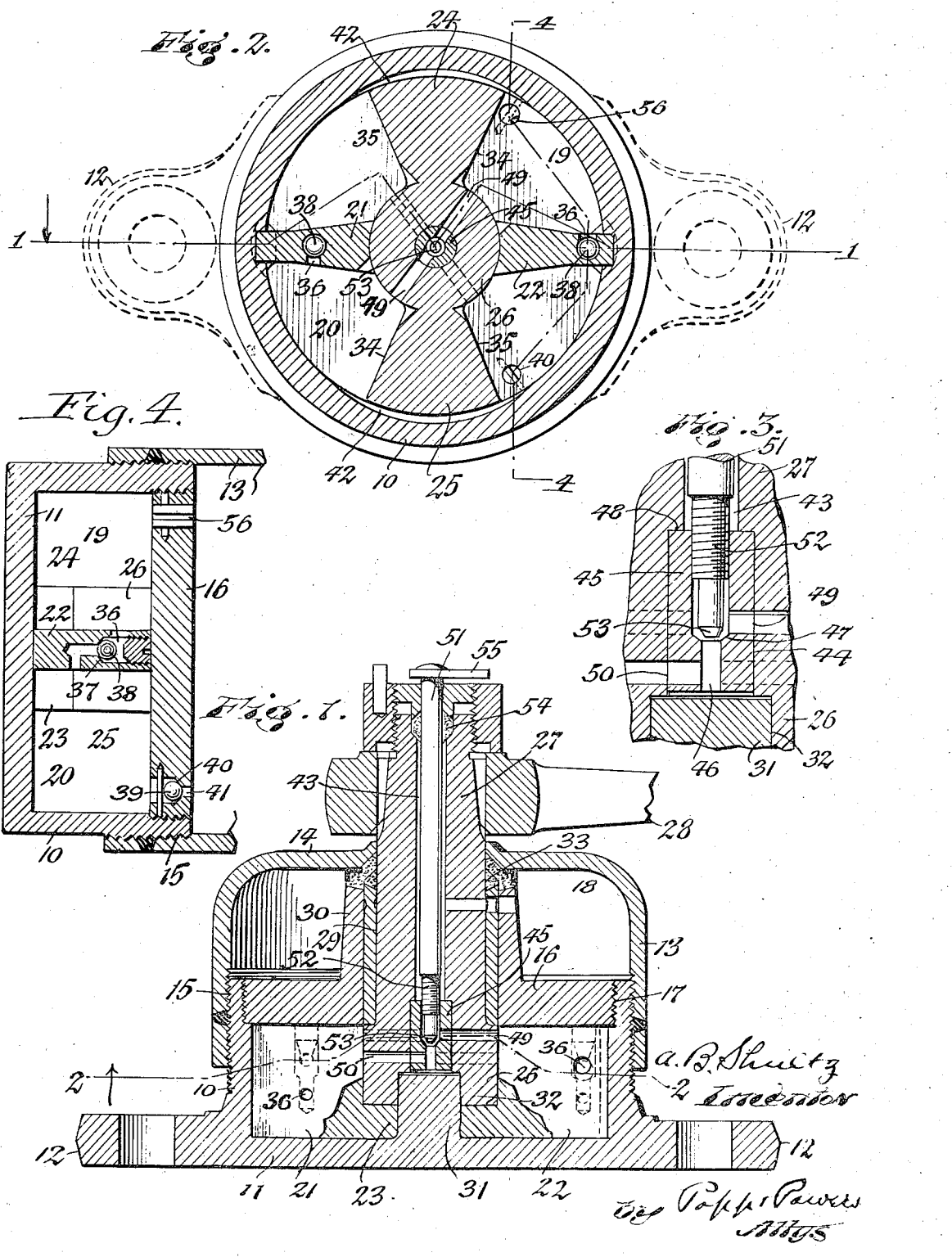

Patented Jan. 1, 1929.

1,697,577

UNITED STATES PATENT OFFICE.

ALBERT B. SHULTZ, OF BUFFALO, NEW YORK, ASSIGNOR TO HOUDE ENGINEERING CORPORATION, OF BUFFALO, NEW YORK, A CORPORATION OF NEW YORK.

SHOCK ABSORBER.

Application filed February 3, 1926, Serial No. 85,677. Renewed November 10, 1926.

This invention relates to a shock absorber which is more particularly adapted for use on automobiles for the purpose of reducing the shock on the body of the car and the occupants thereof, although the same may also be used to advantage in other installations where similar conditions exist.

Heretofore the valve seat for regulating the flow of resistance fluid from the high pressure to the low pressure side of the pistons was formed directly on the material of which the pistons and the operating shaft were constructed integrally. This is objectionable because it necessitated making the operating shaft and pistons of comparatively soft material in order to permit of boring an axial liquid passage the entire length thereof and form a seat for the regulating valve which soft material however would often break when the shock absorber was subjected to an extraordinarily heavy or sudden load. Making the operating shaft and pistons wholly of one piece of hard metal, such as cast steel, is also impractical because drilling of the long passes axially through the shaft and pistons would result in too frequent breakage of the drills and thus unduly raise the cost of this work.

It is one of the objects of this invention to permit of using hard metal, such as cast steel for the operating shaft and pistons and soft metal for the fluid regulating valve seat and thus obtain the required strength in the shaft and pistons and also permit of forming the liquid passage and regulating valve seat easily and economically.

A further object of this invention is to provide for adjusting the flow of resistance liquid more accurately and thus securing a better control over the action of the shock absorber. To that end this invention consists principally in providing a piston and shaft of hard metal with a separate bushing of soft metal in which the regulating valve seat is formed thus permitting of easily machining or boring the bushing and securing the maximum strength in the shaft and pistons, and also permitting of constructing the fluid regulating valve mechanism more perfectly so that the action of the shock absorber will be under better and closer control.

In the accompanying drawings:—

Figure 1, is a horizontal longitudinal section of a shock absorber embodying my invention taken on line 1—1, Fig. 2.

Figure 2, is a vertical transverse section taken on line 2—2, Fig. 1.

Figure 3, is a fragmentary longitudinal section, of the fluid controlling mechanism similar to Fig. 1, on an enlarged scale.

Figure 4, is a fragmentary vertical longitudinal section taken on line 4—4, Fig. 2 and showing the check valve in one of the pistons, the air vent controller, and the liquid replenishing valve.

Similar characters of reference indicate like parts in the several figures of the drawings.

This shock absorber includes a casing which is composed of a rear or pressure section and a front or storage section. The rear section preferably consists of an annular side wall 10 which is closed at its rear end by a transverse wall 11 having ears 12 on its opposite ends whereby the same is secured by bolts or otherwise to one of the relatively movable parts between which the shock absorber is adapted to be interposed. The front or storage section of the casing consists of an annular side wall 13 which is closed at its front end by a transverse front wall 14 while its rear end is connected by a screw joint 15 with the front end of the side wall of the rear casing section. The space within the casing is divided by a main transverse partition 16 which is secured at its periphery in the bore of the side wall of the rear casing section by a screw joint 17. The space within the front section of the casing forms a storage chamber 18 in which oil or other liquid such as glycerine which serves as a shock absorbing medium is held in reserve and provides a supply from which the pressure chambers 19, 20 of the shock absorber are replenished as required. This liquid is supplied to the storage chamber through a filling opening which is normally closed by a plug, this opening and plug not being shown in the drawings but being the same as that shown and described in Letters Patent No. 1,426,115 granted to myself August 15, 1922.

The pressure compartments 19, 20 are semi-cylindrical and formed in the rear section of the casing between a diametrical partition composed of two radial sections or wings 21, 22 fitted at their outer ends against the bore of the rear side wall 10 and engaging their rear ends with the rear wall of the rear casing section and their front ends with the main partition 16, and connected at their outer rear corners by a central disk 23.

Arranged within the pressure chambers 19, 20, respectively, are two pistons 24, 25 which oscillate therein and are connected at their inner ends by a hub 26 which is interposed between the partition disk 23 and the main partition 16 and each of said pistons engaging its outer end with the bore of the respective semi-cylindrical pressure chamber while their rear ends engage with the rear wall of the pressure chambers and their front ends engage with the main partition.

Projecting forwardly from the hub of the pistons is a main operating shaft 27 which extends through the main partition, the storage chamber and the front wall of the latter to the exterior of the casing and is provided at its outer extremity with a rock arm 28 which is adapted to be connected in any suitable manner with another member of the relatively movable parts between which the shock absorber is interposed so that the shaft and the pistons will be rocked or oscillated as these relatively movable parts move one toward and from the other, as would be the case, for example between the axle and the body of an automobile which are yieldingly connected by springs. The pistons, the hub connecting the same, and the operating shaft are constructed integrally of cast steel or a hard and strong metal which is not liable to give way under the severest usage to which the same may be subjected. The pistons and the operating shaft are journaled on the casing and maintained in axial alignment with the semi-cylindrical pressure chambers by mounting the rock shaft in a bearing 29 formed in a sleeve 30 projecting forwardly from the central part of the main partition and a centering or pivot pin 31 projecting from the rear wall of the casing through an opening in the center disk 23 and into a circular recess 32 formed in the rear side of the hub of the pistons. A leak tight joint is formed between the operating shaft and bearing of the sleeve and the front wall of the casing by a packing 33 which may be of any suitable construction.

Normally each of the pressure chambers is filled with pressure resisting liquid on opposite sides of the pistons and means are provided which permit the liquid to flow comparatively free from one side of the pistons to the other while the same are moving in one direction but a reverse flow is either prevented or retarded when the pistons move in the opposite direction and thereby offer a comparatively small resistance to the movement of the pistons in one direction but a considerable resistance thereto in the opposite direction for the purpose of absorbing shock, as for instance during the rebound of a car when traveling over an uneven roadway. Free flow of liquid from the low pressure side 34 of each piston to the high pressure side 35 of the other piston but checking reverse flow of the same is accomplished in the present case by a check passage 36 arranged in each wing partition and extending from one side to the other thereof and provided with a valve seat 37 facing toward the high pressure side of one piston, and a ball check valve 38 arranged in said check passage and movable toward and from said valve seat 37, as shown in Fig. 4.

During the forward active or shock absorbing movement of the pistons both check valves 38 engage their seats and thus prevent the passage of any resistance liquid therethrough whereby the advance movement of the pistons is retarded inasmuch as at this time the pistons can only move forward at such a rate as is permitted by leakage past the joints between the pistons and the walls of the pressure chamber and the means which are provided for controlling the forward or shock absorbing movement of the pistons. The return or backward motion of the pistons is however attended with little resistance due to the fact that the check valves 38 during this time open automatically under liquid pressure, thereby permitting the liquid to flow freely from one pressure chamber on the low pressure side of the piston therein into the other pressure chamber on the high pressure side of the piston therein, whereby the pistons are free to move backward comparatively rapid.

As the resistance liquid in the pressure chambers is reduced by waste or leakage the supply to the pressure chamber is automatically replenished by a check valve 39 adapted to engage a seat 40 in a passage 41 extending from the liquid storage chamber to the lower part of the pressure chambers, so that when the adjacent piston moves forwardly with its high pressure side, liquid will be drawn into the space in rear of its lower pressure side from the storage reservoir, but during a reverse movement of this piston the pressure liquid will not be able to flow back into the storage chamber and instead is compelled to distribute itself in the pressure chambers during the working of the shock absorber.

Each of the pressure chambers is provided in the central part of the side wall of the respective chamber with a circumferential by-pass or groove 42 which is deep at the center and gradually becomes shallow toward its opposite ends, whereby pressure liquid is free to escape from one side of each piston to the other during light vibrations of the car while running over comparatively even roads and thus practically eliminating any appreciable effect of the shock absorber so as to produce an easy riding action, but when the pistons increase the length of their stroke due to rough roads the pistons gradually move past the by-pass grooves and thus encounter the greater resistance of the fluid and increase the shock absorbing effect accordingly.

Any air which may enter the pressure chambers with the oil or otherwise is permitted to escape from the upper part of the pressure space through an air vent opening 56 in the partitions 16 to the upper part of the storage or replenishing chamber 18, as shown in Figs. 1 and 4.

Means are provided whereby the flow of pressure fluid from one side of the pistons to the other may be regulated at will so as to accurately control the movement of the pistons in accordance with the weight of the car, the character of its spring suspension or to suit other conditions. The preferred form of the means embodying my invention whereby this is accomplished is as follows:—

Formed lengthwise of the axis of the operating shaft and the hub of the pistons is a longitudinal bore which extends from the inner end of this hub to the outer end of this shaft and consists of a comparatively long outer section 43 of small diameter and a comparatively short section 44 of larger diameter.

Arranged within this short bore section 44 is a valve bushing or sleeve 45 which may be held in place therein by a driving fit or otherwise, and is provided with a longitudinal passage 46 having a forwardly or outwardly facing valve seat 47. This sleeve is constructed of soft metal which can be easily bored and machined and the same is driven into the inner end of the large part of the longitudinal bore until it engages a shoulder 48 between the large and small parts of this bore. Said longitudinal passage communicates in front of its seat 47 with the pressure chambers on the low pressure sides of the pistons by front branch passages 49 extending laterally through corresponding parts of said bushing and the hub of the pistons, and in rear of said valve seat 47 the longitudinal passage communicates with the pressure chambers on the high pressure sides of the pistons therein by rear branch passages 50 extending laterally through corresponding parts of the bushing and the hub of the pistons, as shown in Figs. 1, 2 and 3.

Within the longitudinal bore of the operating shaft and the hub of the pistons is arranged a valve stem or rod having a comparatively long cylindrical front part 51 which is arranged in the front small part of said bore, and externally screw threaded intermediate part 52 engaging with the corresponding screw threaded outer end part of the longitudinal passage in said bushing, and a regulating valve 53 on its inner part which is adapted to move toward and from said valve seat 47 upon turning the valve stem or rod in one direction or the other. This turning movement is effected manually by a handle or finger piece 55 arranged at the outer end of the valve stem which projects beyond the front end of the operating shaft. Leakage through the joint between the stem valve and the outer part of the operating shaft is prevented by a packing 54 between these parts which may be of any suitable form.

Upon turning the valve stem in one direction the valve 53 is moved away from its seat and upon turning the stem in the opposite direction this valve will be moved toward said seat, whereby the size of the regulating passage ways between the pressure chambers and the free flow of resistance fluid from one side of the pistons to the opposite sides thereof may be varied and accurately determined to suit the special requirements of a particular installation.

By making the seat of the regulating valve on a bushing or sleeve which is separate from the part forming the pistons, hub and operating shaft the last mentioned parts can be made of cast steel or other hard metal which has the requisite strength but is difficult to bore while the bushing may be made of soft metal such as iron or soft steel which can be easily and accurately bored, turned and machined by comparatively short tools which are not liable to break. The longitudinal bore in this shaft and hub can be formed roughly by casting or otherwise thereby avoiding the necessity of drilling which in the case of holes or openings of this length frequently results in breaking drills and also causes the drills to run to one side and therefore produce inaccurate work.

I claim as my invention:—

1. A shock absorber comprising a pressure chamber, a piston oscillating in said chamber and having a hub, an operating shaft projecting from said hub, said hub and shaft having a longitudinal opening extending from the inner to the outer ends of the same, a bushing arranged within the inner part of said opening and having a longitudinal passage and a valve seat in said passage, and said bushing and hub being provided with branch passages extending from the longitudinal passage of the bushing in front and in rear of the seat thereof to said pressure chamber on opposite sides of the piston therein, and a valve stem arranged within said shaft and provided with a valve movable toward and from said seat.

2. A shock absorber comprising a pressure chamber, a piston oscillating in said chamber and having a hub, an operating shaft projecting from said hub, said hub and shaft having a longitudinal opening extending from the inner to the outer ends of the same, a bushing arranged within the inner part of said opening and having a longitudinal passage and a valve seat in said passage, and said bushing and hub being provided with branch passages extending from the longitudinal passage of the bushing in front and in rear of the seat thereof to said pressure chamber on opposite sides of the piston therein, and a valve stem arranged within said shaft and provided with a valve movable toward and from said seat and having a screw connection with said bushing.

3. A shock absorber comprising a pressure chamber, a piston oscillating in said chamber and having a hub, an operating shaft projecting from said hub, said hub and shaft having a longitudinal opening extending from the inner to the outer ends of the same, a bushing arranged within the inner part of said opening and having a longitudinal passage and a valve seat in said passage and said bushing and hub being provided with branch passages extending from the longitudinal passage of the bushing in front and in rear of the seat thereof to said pressure chamber on opposite sides of the piston therein, and a valve stem arranged within said shaft and provided with a valve movable toward and from said seat, said bushing being made of soft metal and said shaft, hub and piston of hard metal.

4. A shock absorber comprising a pressure chamber, a piston oscillating in said chamber and having a hub and an operating shaft formed integrally therewith, said hub and shaft having a longitudinal opening consisting of a comparatively long and small outer part and a comparatively short large part, forming an inwardly facing shoulder between the large and small parts of said longitudinal opening, a bushing fitted in the large part of said longitudinal opening and engaging the shoulder between the same and the small part thereof, said longitudinal opening communicating in front and in rear of said valve seat with said pressure chamber on opposite sides of said piston, and a valve stem arranged in said longitudinal opening and having a screw connection with said bushing and having a valve movable toward and from said valve seat.

5. A shock absorber comprising a pressure chamber; a piston oscillating in said chamber and having a hub and an operating shaft projecting from said hub; said hub and shaft having an axial opening extending from the inner end of the hub to the outer end of said shaft; a bushing arranged within the inner part of said opening, said hub and bushing being provided with a diametrical passage which connects the space in said chamber on opposite sides of said piston and which is provided with a longitudinal valve bore which intersects said diametrical passage and a valve seat in said bore between the ends of said diametrical passage; and a longitudinally movable valve stem arranged in the axial opening and having a valve at its inner end which is movable toward and from said valve seat for controlling said diametrical passage.

6. A shock absorber comprising a pressure chamber; a piston oscillating in said chamber and having a hub and an operating shaft projecting from said hub; said hub and shaft having an axial opening extending from the inner end of the hub to the outer end of said shaft; a bushing arranged within the inner part of said opening, said hub and bushing being provided with a diametrical passage which connects the space in said chamber on opposite sides of said piston and which is provided with a longitudinal valve bore which intersects said diametrical passage and a valve seat in the inner part of said bore between the ends of said diametrical passage and an internal screw thread in the outer part of said bore; and a longitudinally movable valve stem arranged in said axial opening and bore and having an external screw thread engaging said internal screw thread and a valve at its inner end movable toward and from said valve seat for controlling said diametrical passage.

ALBERT B. SHULTZ.